(12) United States Patent
Boelitz

(10) Patent No.: US 8,424,808 B2
(45) Date of Patent: Apr. 23, 2013

(54) COMPENSATING FOR WIND PRIOR TO ENGAGING AIRBORNE PROPULSION DEVICES

(75) Inventor: Frederick W. Boelitz, Sammamish, WA (US)

(73) Assignee: Blue Origin, LLC, Kent, WA (US)

( * ) Notice: Subject to any disclaimer, the term of this patent is extended or adjusted under 35 U.S.C. 154(b) by 124 days.

(21) Appl. No.: 12/816,267

(22) Filed: Jun. 15, 2010

(65) Prior Publication Data

US 2010/0314497 A1 Dec. 16, 2010

Related U.S. Application Data

(60) Provisional application No. 61/187,253, filed on Jun. 15, 2009, provisional application No. 61/187,249, filed on Jun. 15, 2009.

(51) Int. Cl.
*G05D 1/00* (2006.01)
*B64G 1/62* (2006.01)

(52) U.S. Cl.
USPC ........................................ 244/183; 244/158.9

(58) Field of Classification Search .................... 244/63, 244/183, 184, 188, 158.9, 159.3, 171.1, 171.3, 244/81, 138 R
See application file for complete search history.

(56) References Cited

U.S. PATENT DOCUMENTS

| | | |
|---|---|---|
| 3,305,194 A | 2/1967 | McCorkle, Jr. |
| 3,362,658 A | 1/1968 | Tushie |
| 3,568,954 A | 3/1971 | McCorkle, Jr. |
| 3,693,909 A | 9/1972 | Hall |
| 3,891,166 A | 6/1975 | May |
| 3,966,142 A | 6/1976 | Corbett et al. |
| 4,008,869 A | 2/1977 | Weiss |
| 4,111,382 A | 9/1978 | Kissinger |
| 5,052,638 A | 10/1991 | Minovitch |
| 5,318,256 A * | 6/1994 | Appleberry ................ 244/158.9 |
| 5,568,901 A | 10/1996 | Stiennon |
| 5,593,110 A | 1/1997 | Ransom et al. |
| 5,647,558 A | 7/1997 | Linick |
| 5,695,152 A | 12/1997 | Levy |
| 5,804,812 A | 9/1998 | Wicke |
| 5,873,549 A * | 2/1999 | Lane et al. ................ 244/158.9 |
| 5,927,653 A | 7/1999 | Mueller et al. |
| 6,254,030 B1 | 7/2001 | Sloan, Jr. et al. |

(Continued)

OTHER PUBLICATIONS

International Search Report and Written Opinion, International Application No. PCT/US2010/038725, Applicant: Blue Origin, LLC., mailed Aug. 11, 2010, 11pages.

*Primary Examiner* — Tien Dinh
*Assistant Examiner* — Richard R Green
(74) *Attorney, Agent, or Firm* — Perkins Coie LLP

(57) ABSTRACT

Technology is described for enabling a reusable launch vehicle to compensate for wind prior to engaging propulsion during approach to landing. The technology can cause the reusable launch vehicle to begin un-powered descent; determine a first rotation angle of the reusable launch vehicle about a specified vertical descent path, the first rotation angle corresponding to a first attitude of the reusable launch vehicle selected to stabilize the reusable launch vehicle on the vertical descent path based on a wind speed and angle; and prior to engaging a propulsion device, command a second rotation angle for the reusable launch vehicle, the second rotation angle corresponding to a second attitude that, when the propulsion device is engaged, will cause the reusable launch vehicle to remain at least approximately at the vertical descent path.

22 Claims, 6 Drawing Sheets

U.S. PATENT DOCUMENTS

| | | |
|---|---|---|
| 6,364,252 B1 | 4/2002 | Anderman |
| 6,380,526 B1 | 4/2002 | Kau |
| 6,457,306 B1 | 10/2002 | Abel et al. |
| 6,468,721 B1 | 10/2002 | Twist et al. |
| 6,502,786 B2 | 1/2003 | Rupert et al. |
| 6,574,532 B2 | 6/2003 | Lohmiller |
| 6,666,402 B2 | 12/2003 | Rupert et al. |
| 6,666,410 B2 | 12/2003 | Boelitz et al. |
| 6,817,580 B2 * | 11/2004 | Smith ................ 244/158.9 |
| 6,941,177 B2 | 9/2005 | Jackson et al. |
| 6,993,397 B2 | 1/2006 | Jackson et al. |
| 7,280,917 B2 | 10/2007 | Hager et al. |
| 7,499,181 B2 | 3/2009 | Mirand et al. |
| 7,566,026 B2 | 7/2009 | Lam et al. |
| 2003/0150961 A1 | 8/2003 | Boelitz et al. |
| 2003/0192984 A1 | 10/2003 | Smith |
| 2005/0278120 A1 | 12/2005 | Manfred et al. |
| 2010/0314487 A1 | 12/2010 | Boelitz et al. |

* cited by examiner

COMPENSATING FOR WIND PRIOR TO ENGAGING AIRBORNE PROPULSION DEVICES

CROSS-REFERENCE TO RELATED APPLICATION(S)

The present application claims the benefit of U.S. Provisional Patent Application No. 61/187,253 filed on Jun. 15, 2009, entitled Compensating for Wind Prior To Engaging Airborne Propulsion Devices, and U.S. Provisional Patent Application No. 61/187,249 filed on Jun. 15, 2009, entitled Predicting and Correcting Trajectories, both of which are hereby incorporated by reference in their entireties. This application is related to U.S. patent application Ser. No. 12/816,284, filed Jun. 15, 2010, which is incorporated by reference herein in its entirety.

TECHNICAL FIELD

The present disclosure relates generally to airborne vehicles (e.g., space launch vehicles) and, more particularly, to compensating for wind prior to engaging propulsion during approach to landing reusable launch vehicles.

BACKGROUND

Rocket powered launch vehicles (e.g., space launch vehicles) have been used for many years to carry human and non-human payloads into space. Rockets delivered humans into Earth orbit and to the moon, and have launched many satellites into Earth orbit or beyond. More recently, rockets have been used to launch unmanned space probes and to deliver supplies and personnel to the orbiting International Space Station.

Despite advances in manned and unmanned space flight, delivering astronauts, satellites, and other payloads to space continues to be very expensive. A reason is that all or portions of conventional launch vehicles are used only once. Such vehicles are referred to as "expendable launch vehicles" (ELVs). An example of an ELV is a conventional, multi-stage rocket that delivers a satellite to space: only the payload survives the journey and all other components are jettisoned or otherwise expended. An example of a partially reusable vehicle is the NASA space shuttle. The space shuttle's main external fuel tank is used only once whereas its main engines, two solid rocket boosters, and the space shuttle itself are reusable after substantial reconditioning. Although NASA's space shuttle is only partially expended and is largely reusable, reconditioning the reusable components is a costly and time consuming process that requires an extensive ground-based infrastructure.

As commercial interest in access to space increases, a need remains to reduce costs significantly. Various reusable launch vehicles (RLVs) have been proposed to reduce costs because a significant portion of such vehicles can be completely reused with much less reconditioning than the space shuttle requires.

DETAILED DESCRIPTION

Methods and systems (collectively, "technology") are described for compensating for wind prior to engaging a propulsion device during approach to landing of reusable launch vehicles (RLVs). An RLV ascends under propulsion and can descend, at least partially, under gravitational forces, e.g., after attaining the apogee of its trajectory. As the RLV approaches the landing site, its descent path can be vertically aligned, e.g., to confine the RLV to a selected geographical region. When the RLV descends along a specified vertical descent path, winds can cause the RLV to drift away from the vertical descent path. To compensate for the wind drift, the RLV may descend at an attitude that prevents, minimizes, or at least reduces drift. As the RLV descends below a specified threshold altitude above the landing site, it can engage a propulsion system or device ("propulsion device") to significantly reduce its vertical descent speed in preparation for landing. To prevent the RLV from deviating from the vertical descent path significantly when the propulsion device is engaged, the RLV can be commanded into an orientation that prevents or at least significantly reduces the deviation.

The technology will now be described with reference to the Figures. In the Figures, identical reference numbers identify identical or at least generally similar elements. To facilitate the discussion of any particular element, the most significant digit or digits of any reference number refers to the Figure in which that element is first introduced. For example, element 100 is first introduced and discussed with reference to FIG. 1.

Figure 1A:
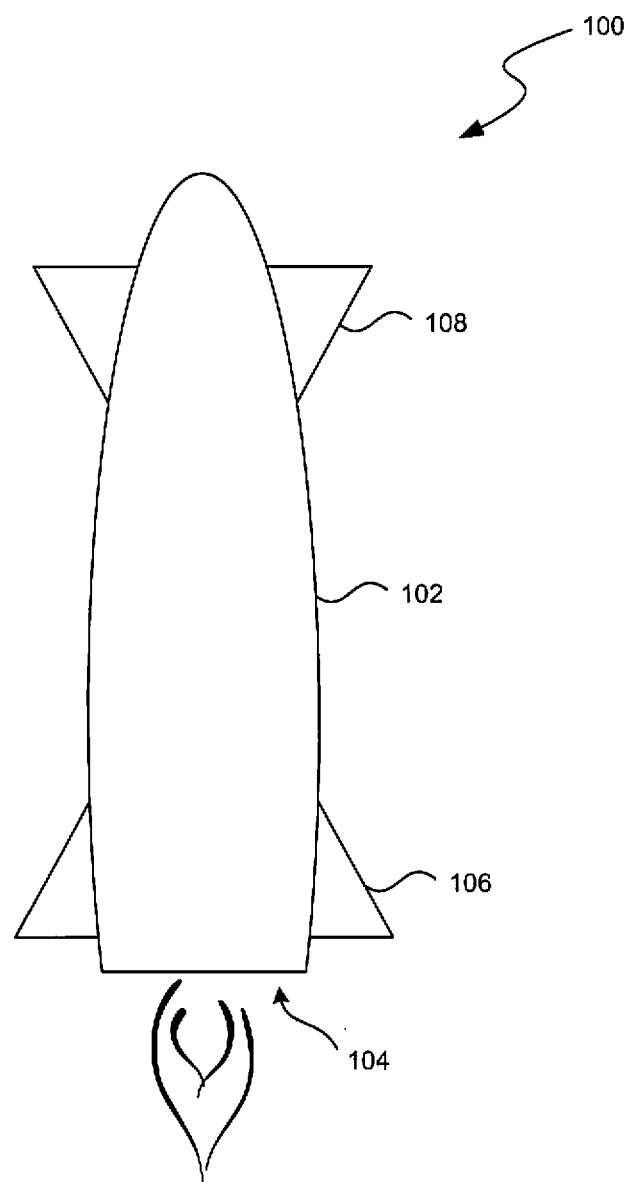
FIG. 1A is a partially schematic, isometric illustration of a reusable launch vehicle configured in accordance with various embodiments of the disclosure.

FIG. 1A is a partially schematic, isometric illustration of a reusable launch vehicle (RLV) 100 configured in accordance with various embodiments of the disclosure. The RLV 100 can include a main section 102, a propulsion device 104, and various aerodynamic control surfaces 106 and 108. In various embodiments, the main section 102 can carry various payloads, such as humans, satellites, and/or other payloads.

The propulsion device 104 can be a rocket-based propulsion device or other propulsion device. The RLV can include multiple propulsion devices 104 (not illustrated). Some propulsion devices can be larger or smaller than other propulsion devices. The propulsion devices can be attached to various surfaces and can be moveable (e.g., as moveable thrusters, engines, or motors that can vector thrust in various directions).

The RLV can include one or more moveable aerodynamic control surfaces 106 that permit the RLV to change its trajectory. The RLV can command these moveable aerodynamic control surfaces 106 (e.g., to expand, contract, rotate about an axis, etc.) to change its flight profile during ascent or descent.

The RLV can also include one or more deployable aerodynamic control surfaces 108 (e.g., flared aerodynamic surfaces) that are stowed during ascent to minimize drag and are deployed during descent to increase drag and change the aerodynamic stability properties of the RLV, including the RLV's center of pressure. By modifying drag and/or lift characteristics, the deployable flared aerodynamic control surfaces 108 can cause the RLV 100 to slow during descent. The RLV may also include other devices for slowing descent, such as one or more parachutes (not illustrated). In some embodiments (not illustrated), the RLV can deploy some aerodynamic control surfaces during ascent and slow these surfaces during descent.

Figure 1B:
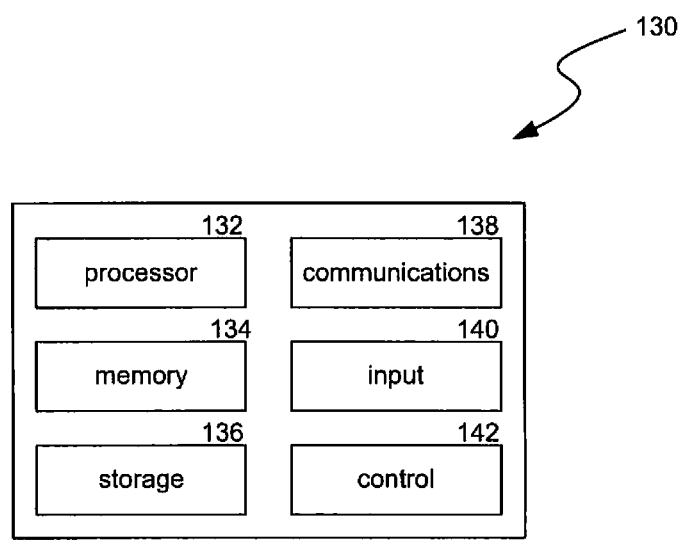
FIG. 1B is a block diagram illustrating components employed by reusable launch vehicles in accordance with various embodiments of the disclosure.

FIG. 1B is a block diagram illustrating components employed by reusable launch vehicles in accordance with various embodiments of the disclosure. The components can include a computing environment 130. The computing environment 130 can include multiple components. As examples, the computing environment 130 can include one or more of each of the following components: processor 132, memory 134, storage 136, communications facility 138, input 140, and control 142.

The processor 132 can be a conventional processor or a special-purpose processor designed for use in RLVs or other space launch vehicles. Other hardware components of the computing environment 130 may similarly be either conventionally designed components or specially designed for use in RLVs or other space launch vehicles.

The memory 134 can store computer-executable instructions, data, etc. The memory may be available to one or more processors 132 or other components.

The storage 136 can be additional (e.g., "secondary") storage employed by the computing environment. The storage may be available to one or more processors 132 or other components.

The communications facility 138 can enable data communications between the illustrated and other components. As examples, the communications facility may enable data or voice communications with ground-based systems, such as systems located at a command and control center.

The input component 140 can collect and provide input from sensors, navigation units (e.g., inertial navigation units, GPS devices, and so forth), and/or other devices and/or users. One or more processors may collect, store, and/or analyze the information collected from the sensors.

Processors can employ one or more control components 142 to command the aerodynamic control surfaces (e.g., to deploy, stow, rotate, etc.), propulsion devices (e.g., thrusters, motors, engines, etc.), and other parts of the RLV to cause the RLV to change its trajectory. The control component 142 can also be employed to control non-trajectory-oriented components, such as to control interior temperature, breathable air content, pressurization, etc.

Figure 2:
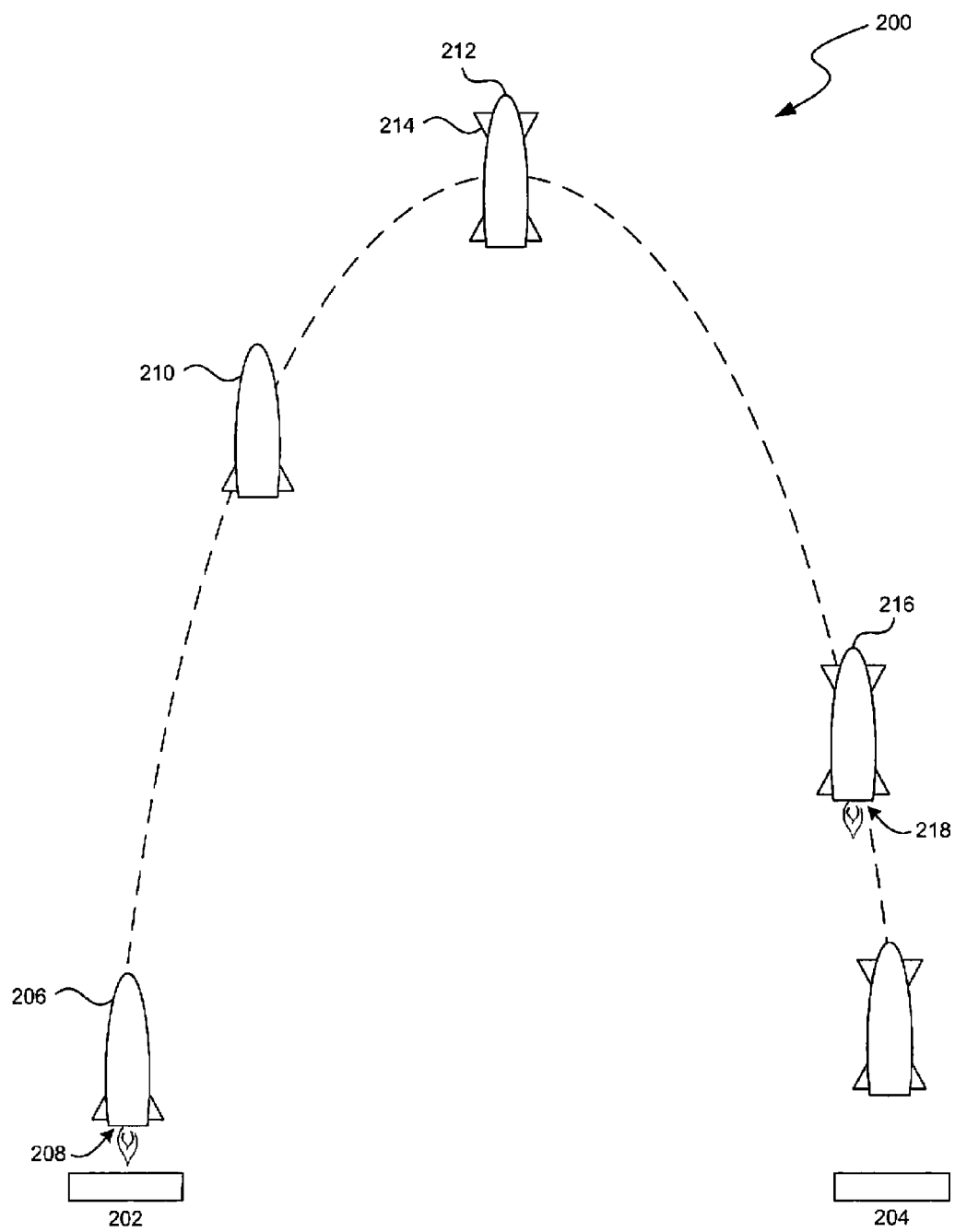
FIG. 2 is a schematic diagram illustrating a mission profile of a reusable launch vehicle in accordance with various embodiments of the disclosure.

FIG. 2 is a schematic diagram illustrating a mission profile 200 of a reusable launch vehicle in accordance with various embodiments of the disclosure. In a powered ascent configuration 206, an RLV lifts off using a propulsion device 208 from a liftoff site 202. In the powered ascent configuration, the RLV may direct its propulsion devices to affect its trajectory. It may also command its moveable aerodynamic control surfaces 106 to affect its trajectory (e.g., to change the trajectory based on experienced winds aloft). To control the latitude and longitude of the RLV during powered ascent, the control 142 (see FIG. 1B) can command roll, pitch, yaw attitude, attitude rate of change, acceleration and/or position. Although the RLV is illustrated as being vertically aligned throughout flight, it can enter various attitudes as appropriate to maintain a specified trajectory.

At a computed time, the RLV continues in an un-powered ascent configuration 210. In the un-powered ascent configuration 210, the RLV can command its moveable aerodynamic control surfaces 106 and propulsion devices to affect its trajectory (e.g., to change the trajectory based on experienced winds aloft).

At some point (e.g., before, at, or after achieving its apogee), the RLV can enter an un-powered descent configuration 212. In this un-powered descent configuration, the RLV can deploy its deployable flared aerodynamic control surfaces 108 (illustrated as surfaces 214).

When nearing the landing site 204, the RLV can employ one or more propulsion devices 218 in a powered slowdown configuration 216 to further slow the RLV. In various embodiments, the RLV can employ thrusters, engines, motors, and/or moveable aerodynamic control surfaces 106 to position the RLV above the landing site 204 prior to landing.

In some embodiments, the landing site 204 can be moveable and can include a broadcast station (not illustrated) for communicating its position and/or local wind data to the RLV 100 in real-time. This information enables the RLV to continuously check and/or adjust its trajectory to enable it to land at the landing site.

The presently disclosed technology may be described and implemented in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
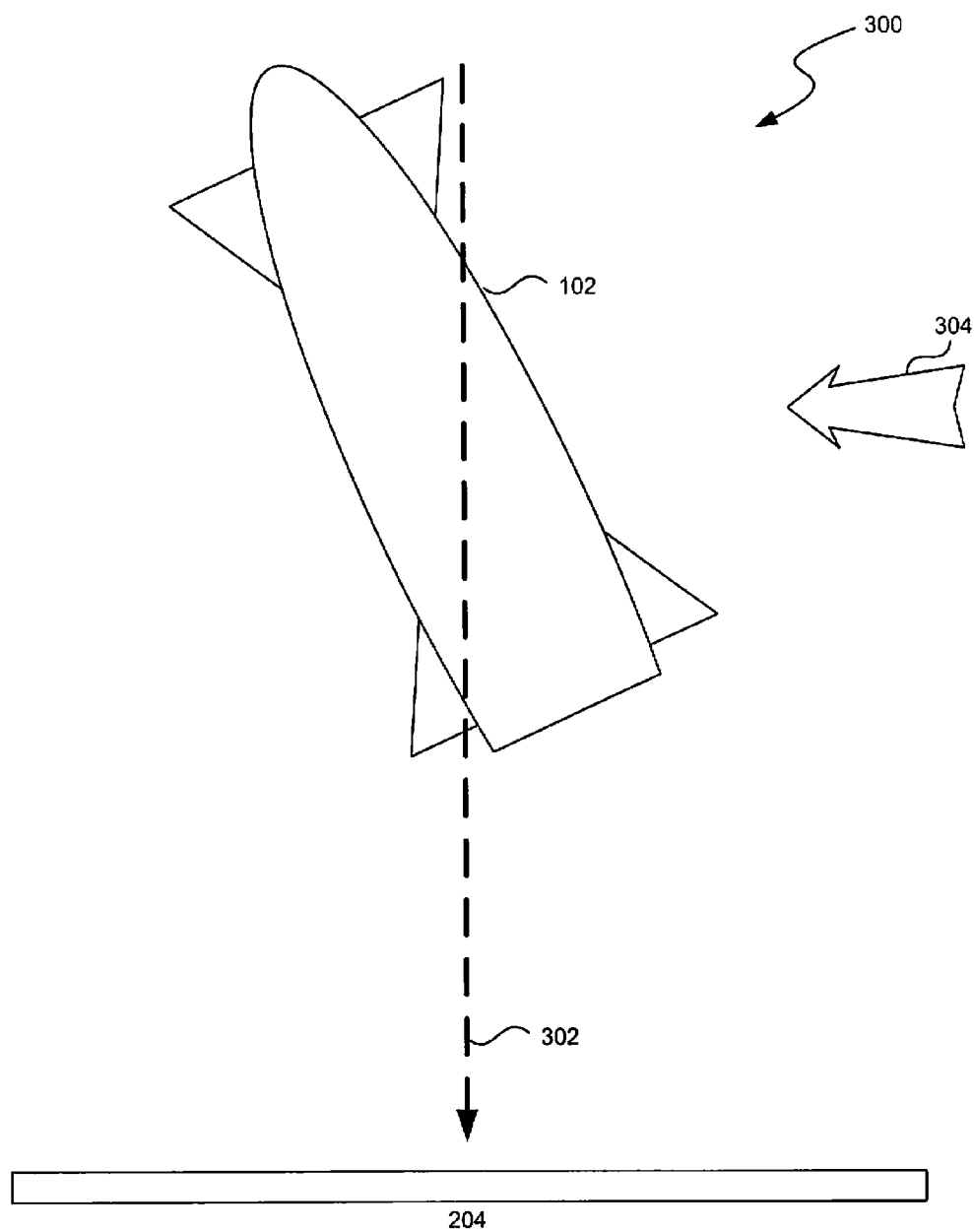
FIG. 3 is a partially schematic, isometric illustration of a reusable launch vehicle configured in accordance with various embodiments of the disclosure.

FIG. 3 is a partially schematic, isometric illustration of a reusable launch vehicle configured in accordance with various embodiments of the disclosure. In the illustrated configuration 300, the RLV 102 is descending vertically along a descent path 302 to land at a landing site 204. To descend vertically in spite of a wind 304, the control 142 (FIG. 1B) can command an attitude that prevents drift caused by the wind 304. In the illustrated configuration 300, the control 142 has commanded an attitude in which the landing portion of the RLV is rotated into the wind. If the RLV were not thus rotated, the wind 304 may be sufficient to cause the RLV to drift away from the landing site. As the RLV approaches the landing site (e.g., within 100 feet of the landing site), the control 142 can command rotation to align the RLV vertically so that the RLV lands in an orientation that is perpendicular to the landing site. The attitude angle varies with the direction and speed of the wind. The greater the wind velocity, the greater the attitude angle and/or lateral velocity generally. Lateral velocity is the velocity of the RLV in the horizontal plane at any given altitude. In a zero-wind condition, the RLV can be aligned vertically so that its longitudinal axis is parallel and coincident with the vertical descent path 302.

In some embodiments, the vertical descent path 302 is not perpendicular to the surface of the landing site 204 and may instead be angled (not illustrated). The angle can be based on an estimate of a wind-induced drift that can occur on a transition from re-entry-based on aerodynamic control surfaces to a landing based on propulsion (e.g., engine) control. In these embodiments, the trajectory may be to a target landing location that is offset from a specified location (e.g., the center) on the landing site 204, but may account for a lateral velocity that will cause the RLV to drift under power toward the specified location on the landing site.

Figure 4:
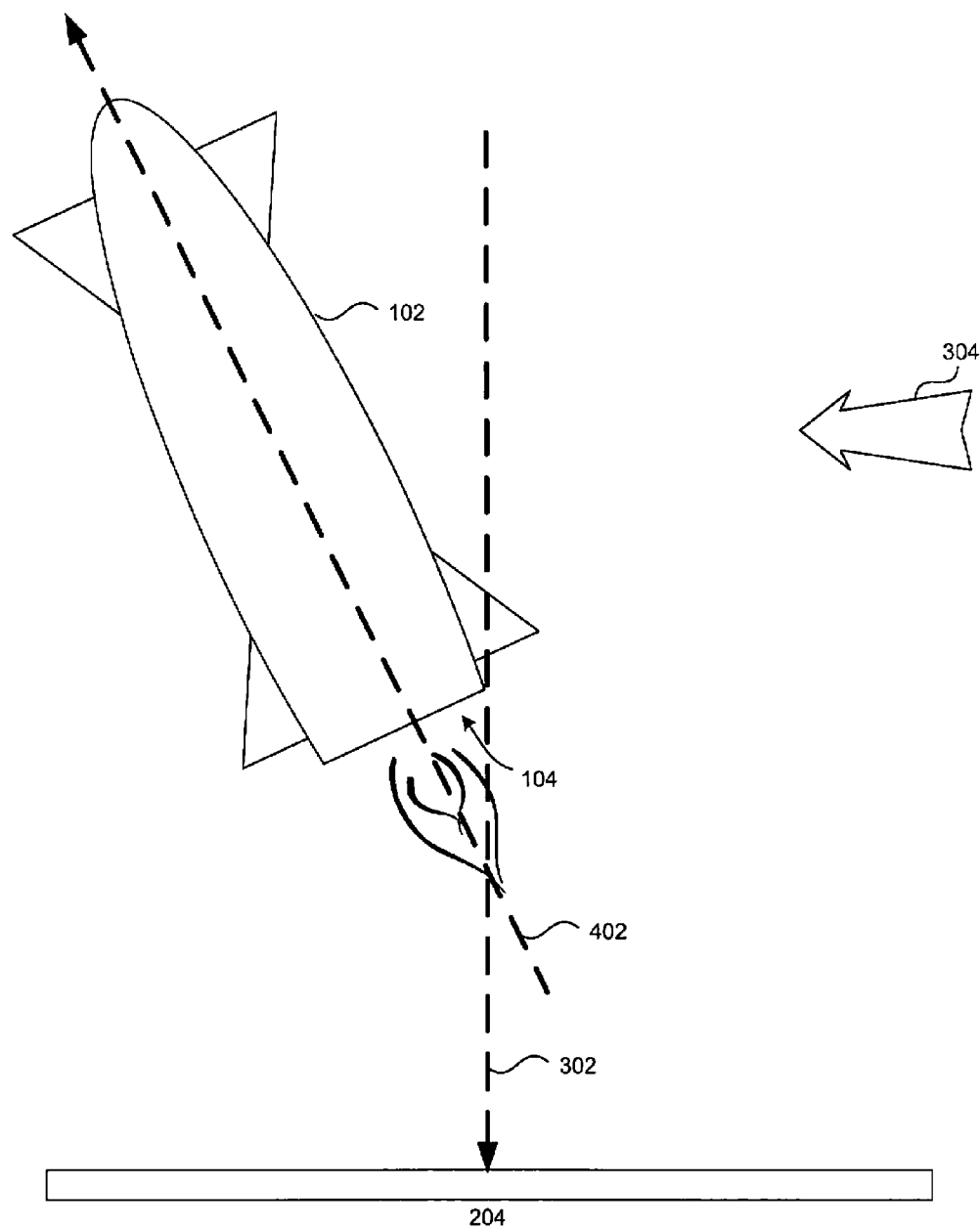
FIG. 4 is a partially schematic, isometric illustration of a reusable launch vehicle configured in accordance with various embodiments of the disclosure.

When the RLV descends below a specified threshold altitude (e.g., 3000 feet above the landing site 204), control 142 can command one or more propulsion devices to slow the descent significantly. In various embodiments, the control 142 may determine an appropriate altitude at which to command propulsion device action based on the rate of descent, acceleration, tilt angle, lateral speed, etc. The descent under power may occur in some embodiments for a short period of time, e.g., 15 seconds. FIG. 4 is a partially schematic, isometric illustration of a reusable launch vehicle configured to engage a propulsion device 104 during descent. The thrust vector caused by the propulsion device in some embodiments is illustrated as vector 402. Because the thrust caused by propulsion is generally significantly greater than the force of the wind 304, the RLV 102 can deviate significantly from the vertical descent path 302 when the propulsion device is engaged.

Figure 5:
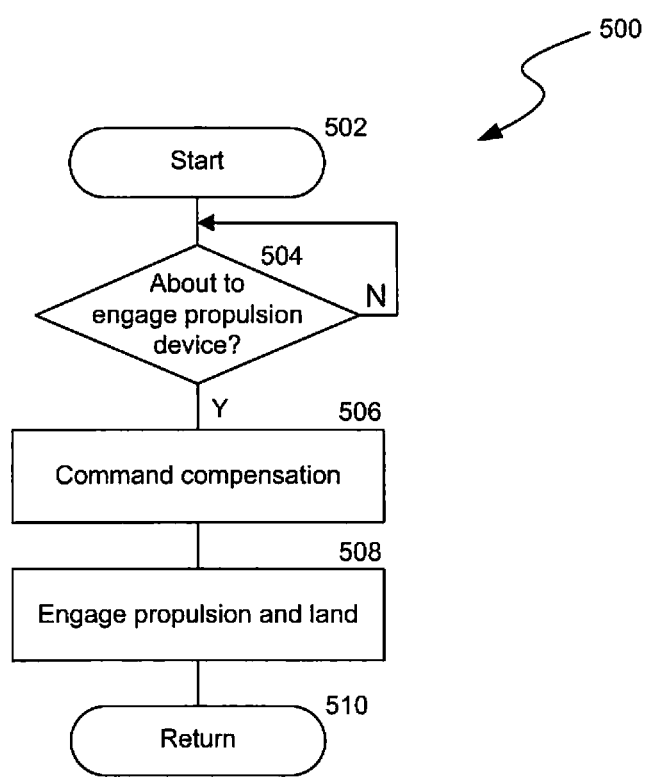
FIG. 5 is a flow diagram illustrating a routine invoked by a control to compensate for wind prior to engaging propulsion during approach to landing of a reusable launch vehicle in accordance with various embodiments of the disclosure.

FIG. 5 is a flow diagram illustrating a representative routine invoked by control to compensate for wind prior to engaging propulsion device during approach to landing of a reusable launch vehicle in accordance with various embodiments of the disclosure. The routine can be invoked by the control 142 during descent and begins at block 502.

The routine loops at decision block 504 until the control 142 determines that it is almost ready to engage propulsion device to slow descent of the RLV.

At block 506, the routine commands compensation. To prevent the RLV from deviating significantly from the vertical descent path 302, control 142 can take various actions prior to engaging the propulsion device 104 to compensate for the deviation that engaging the propulsion device can cause. In some embodiments, the control 142 can command rotation of the RLV (e.g., using aerodynamic control surfaces and/or propulsion devices such as moveable engines) so that engaging the propulsion device 104 would not cause a significant deviation. As an example, the control 142 can rotate the RLV so that it is parallel and coincident with the vertical descent path 302. As another example, control 142 can rotate the RLV so that the combination of the forces from the wind and the propulsion device would not cause the RLV to deviate significantly from the vertical descent path. In other embodiments, control 142 can command positioning of the RLV away from the vertical descent path 302 (e.g., into the direction of the wind which, in the illustration, is to the right of the vertical descent path 302) so that when the propulsion device 104 is engaged, the RLV is repositioned onto the vertical descent path 302. In any of these embodiments, control surfaces and/or some propulsion devices can be used primarily to adjust the attitude of the RLV prior to using propulsion devices to slow the RLV's descent. For example, a selected subset of propulsion devices (e.g., small thrusters) can be used to change the attitude of the RLV before actuating one or more main engines. In another embodiment, the engines can first provide vectored thrust (e.g., along an axis not aligned with the major axis of the RLV) to change the attitude of the RLV, and can then provide thrust directed upwardly along the vertical descent path 302. At this point in the descent, the same or different propulsion devices can also be used to control/steer the RLV to the landing site in addition to slowing it down.

In various embodiments, the control 142 can determine the wind speed and direction based on the attitude angle of the RLV, pre-flight wind measurements, a stored wind map, communications from a ground-based facility configured to observe and report actual winds at the surface of the landing site 204, etc.

In various embodiments, the propulsion device does not cause an instantaneous thrust vector. Because propulsion devices generally increase thrust over time, the control 142 may initially command an over-compensation for the expected thrust vector. As an example, RLV 102 may initially be commanded to rotate past the vertical angle.

Once the control 142 completes commanding the compensation, at block 508 it engages the propulsion device and lands the RLV at the landing site 204. The routine then returns at block 510.

Those skilled in the art will appreciate that the logic illustrated in FIG. 5 and described above, and in each of the flow diagrams discussed below, may be altered in various ways. For example, the order of the logic may be rearranged, substeps may be performed in parallel, illustrated logic may be omitted, other logic may be included, etc.

RLVs can employ one or more computing devices that each or in combination may include one or more central processing units, memory, input devices, output devices, and storage devices. The memory and storage devices are computer-readable media that may be encoded with data structures and computer-executable instructions. In addition, the instructions, data structures, and message structures may be stored or transmitted via a data transmission medium, such as a signal on a communication link. Various communication links may be used to exchange information between the RLV and Earth-based facilities, such as a command and control center.

Aspects of the technology described above can provide advantages over existing methods and devices. As an example, the RLV can remain at or near the vertical descent path when the propulsion device is engaged during landing. This enhances safety for the occupants of the RLV and others because the RLV can be confined to a particular region. As another example, the RLV need not expend significant amounts of fuel to return to the vertical descent path (because it can remain at or close to the vertical descent path even as the propulsion device is engaged), thus conserving fuel for landing.

In particular embodiments, the technology employs aerodynamic control surfaces and thrusters or engines to control direction. In other embodiments, the technology controls the RLV directly (e.g., by specifying a particular altitude, latitude, and longitude that the RLV is to be at a specified time).

In various embodiments, the technology can cause a reusable launch vehicle to compensate for wind prior to engaging propulsion during approach to landing, e.g., by beginning un-powered descent; determining a first rotation angle of the reusable launch vehicle about a specified vertical descent path, the first rotation angle corresponding to a first attitude of the reusable launch vehicle selected to stabilize the reusable launch vehicle on the vertical descent path based on a wind speed and angle; and prior to engaging a propulsion device, commanding a second rotation angle for the reusable launch vehicle, the second rotation angle corresponding to a second attitude that, when the propulsion device is engaged, will cause the reusable launch vehicle to remain at least approximately at the vertical descent path. Commanding the second rotation can include employing at least one propulsion device and/or a control surface to cause the rotation. The technology may command one of several available propulsion devices, e.g., a small thruster or a main engine. These propulsion devices can have different maximum thrust capability. The technology may select a first available propulsion device that is larger than a second available propulsion device (e.g., the first propulsion device has a higher maximum thrust than a second propulsion device) when the wind speed and/or wind angle exceeds a threshold. The technology may alter the second rotation angle based on a position of the reusable launch vehicle during descent as the reusable launch vehicle approaches landing site.

In various embodiments, the technology may include a computer-readable storage medium for storing computer-executable instructions that, when executed, cause a reusable launch vehicle to compensate for wind prior to engaging propulsion during approach to landing. The instructions can include beginning un-powered descent; determining a first rotation angle of the reusable launch vehicle about a specified vertical descent path, the first rotation angle corresponding to a first attitude of the reusable launch vehicle selected to stabilize the reusable launch vehicle on the vertical descent path based on a wind speed and angle; and prior to engaging a propulsion device, commanding a second rotation angle for the reusable launch vehicle, the second rotation angle corresponding to a second attitude that, when the propulsion device is engaged, will cause the reusable launch vehicle to remain at least approximately at the vertical descent path. The technology may include instructions for engaging the propulsion device. Commanding the second rotation can include employing at least one propulsion device and one aerodynamic control surface to cause the rotation and/or selecting one of several available propulsion devices. The technology may account for a lateral velocity to cause the reusable launch vehicle to drift under power toward a specified location on a landing site and/or alter the second rotation angle based on a position of the reusable launch vehicle during descent as the reusable launch vehicle approaches landing site.

The technology may include a system comprising a component configured to begin by the reusable launch vehicle an un-powered descent; a component configured to determine a first rotation angle of the reusable launch vehicle about a specified vertical descent path, the first rotation angle corresponding to a first attitude of the reusable launch vehicle selected to stabilize the reusable launch vehicle on the vertical descent path based on a wind speed and angle; and a component configured to, prior to engaging a propulsion device, command a second rotation angle for the reusable launch vehicle, the second rotation angle corresponding to a second attitude that, when the propulsion device is engaged, will cause the reusable launch vehicle to remain at least approximately at the vertical descent path. The system may also comprise at least two propulsion devices, wherein a first propulsion device has a different maximum thrust capability than a second propulsion device. The system may comprise a component that selects either the first propulsion device, the second propulsion device, or both propulsion devices based on the wind speed or wind angle. The first propulsion device may be a small thruster and the second propulsion device may be a main engine. The system may comprise a component configured to rotate the reusable launch vehicle so that it is parallel and coincident with the vertical descent path. The system may comprise a computing device configured to command a propulsion device associated with the reusable launch vehicle, wherein the computing device has a processor and memory. The system may comprise a computing device that is capable of registering wind information.

The present disclosure is directed generally to vertical powered landings of RLVs. Certain details are set forth above to provide a thorough understanding of various embodiments of the disclosure. Those of ordinary skill in the relevant art will appreciate, however, that other embodiments having different configurations, arrangements, and/or components may be practiced without several of the details above. For example, other embodiments of the disclosure may include additional elements, or may lack one or more of the elements or features described above. Moreover, several details describing structures and processes that are well-known and often associated with RLVs and launching and landing RLVs are not set forth to avoid unnecessarily obscuring the various embodiments of the disclosure.

Although the subject matter has been described in language specific to structural features and/or methodological acts, it is to be understood that the subject matter is not necessarily limited to the specific features or acts described above. The following examples provide additional embodiment of the disclosure.

I claim:

1. A method performed by a reusable launch vehicle for compensating for wind prior to engaging propulsion during approach to landing in a powered slowdown configuration, comprising:
    beginning un-powered descent;
    determining a first rotation angle of the reusable launch vehicle about a specified vertical descent path, the first rotation angle corresponding to a first attitude of the reusable launch vehicle selected to stabilize the reusable launch vehicle on the vertical descent path based on a wind speed and angle; and
    prior to engaging a main propulsion device in the powered slowdown configuration, commanding a second rotation angle for the reusable launch vehicle, the second rotation angle corresponding to a second attitude that, when the main propulsion device is engaged, will cause the reusable launch vehicle to remain at least approximately at the vertical descent path, wherein a thrust vector of the main propulsion device generally points towards a planetary source of gravity during all phases of flight.

2. The method of claim 1 further comprising engaging the main propulsion device.

3. The method of claim 1 wherein commanding the second rotation includes employing at least one propulsion device to cause the rotation prior to entering the powered slowdown configuration.

4. The method of claim 1 wherein commanding the second rotation includes employing at least one aerodynamic control surface to cause the rotation.

5. The method of claim 1 wherein commanding the second rotation includes selecting one of several available propulsion devices prior to entering the powered slowdown configuration.

6. The method of claim 5 further comprising selecting a first available propulsion device that is larger than a second available propulsion device when the wind speed and/or wind angle exceeds a threshold.

7. The method of claim 1 further comprising altering the second rotation angle based on a position of the reusable launch vehicle during descent as the reusable launch vehicle approaches landing site.

8. The method of claim 1, wherein the source of gravity is a planet from which the reusable launch vehicle launched.

9. The method of claim 1, wherein the source of gravity is Earth.

10. A computer-readable storage device for storing computer-executable instructions that, when executed, cause a reusable launch vehicle to compensate for wind prior to engaging propulsion during approach to landing in a powered slowdown configuration, comprising instructions for:
    determining a first rotation angle of the reusable launch vehicle about a specified vertical descent path, the first rotation angle corresponding to a first attitude of the reusable launch vehicle selected to stabilize the reusable launch vehicle on the vertical descent path based on a wind speed and angle; and
    prior to engaging a main propulsion device in the powered slowdown configuration, effecting rotation about a second angle for the reusable launch vehicle, the second rotation angle corresponding to a second attitude that, when the main propulsion device is engaged, will cause the reusable launch vehicle to remain at least approximately at the vertical descent path, wherein a thrust vector of the main propulsion device generally points towards a planetary source of gravity during all phases of flight.

11. The computer-readable storage medium of claim 10 further comprising instructions for engaging the main propulsion device.

12. The computer-readable storage medium of claim 10 wherein effecting the rotation about a second angle includes employing at least one propulsion device and one aerodynamic control surface to cause the rotation prior to entering the powered slowdown configuration.

13. The computer-readable storage medium of claim 10 wherein effecting the rotation about a second angle includes selecting one of several available propulsion devices prior to entering the powered slowdown configuration.

14. The computer-readable storage medium of claim 10 further comprising instructions for accounting for a lateral velocity to cause the reusable launch vehicle to reposition under power toward a specified location on a landing site.

15. The computer-readable storage medium of claim 10 further comprising instructions for altering the second rotation angle based on a position of the reusable launch vehicle during descent as the reusable launch vehicle approaches landing site.

16. A system for compensating for wind prior to engaging propulsion during approach to landing in a powered slowdown configuration by a reusable launch vehicle, comprising:
   a component configured to begin by the reusable launch vehicle an un-powered descent;
   a component configured to determine a first rotation angle of the reusable launch vehicle about a specified vertical descent path, the first rotation angle corresponding to a first attitude of the reusable launch vehicle selected to stabilize the reusable launch vehicle on the vertical descent path based on a wind speed and angle; and
   a component configured to, prior to engaging a main propulsion device in a powered slowdown configuration, command a second rotation angle for the reusable launch vehicle, the second rotation angle corresponding to a second attitude that, when the main propulsion device is engaged, will cause the reusable launch vehicle to remain at least approximately at the vertical descent path, wherein a thrust vector of the main propulsion device generally points towards a planetary source of gravity during all phases of flight.

17. The system of claim 16 further comprising at least secondary propulsion device, wherein the main propulsion device has a different maximum thrust capability than the secondary propulsion device.

18. The system of claim 17 further comprising a component that selects either the main propulsion device, the secondary propulsion device, or both propulsion devices based on the wind speed or wind angle.

19. The system of claim 18 wherein the secondary propulsion device is a small thruster and the main propulsion device is a main engine.

20. The system of claim 16 further comprising a component configured to rotate the reusable launch vehicle so that it is parallel and coincident with the vertical descent path.

21. The system of claim 16 further comprising a computing device configured to command any of the propulsion devices associated with the reusable launch vehicle, wherein the computing device has a processor and memory.

22. The system of claim 21 wherein the computing device is capable of registering wind information.

* * * * *